United States Patent [19]
Ravich

[11] 3,904,292
[45] Sept. 9, 1975

[54] APPARATUS FOR SINGLE SHEET PHOTOGRAPHIC REPRODUCTION

[75] Inventor: Leonard E. Ravich, Boston, Mass.

[73] Assignee: Institute for Graphic Communication, Inc., Boston, Mass.

[22] Filed: Mar. 4, 1974

[21] Appl. No.: 447,532

Related U.S. Application Data

[63] Continuation-in-part of Ser. No. 330,981, Feb. 9, 1973.

[52] U.S. Cl. .................. 355/100; 96/47; 355/99
[51] Int. Cl. ................................. G03b 27/30
[58] Field of Search .......... 355/100, 97, 99, 78, 92, 355/132, 133; 96/47

[56] References Cited
UNITED STATES PATENTS

| | | | |
|---|---|---|---|
| 3,085,488 | 4/1963 | Heiart | 355/100 |
| 3,168,026 | 2/1965 | Limberger | 355/100 |
| 3,212,896 | 10/1965 | Yudelson et al. | 96/61 R |
| 3,372,031 | 3/1968 | Baylis et al. | 96/64 |
| 3,651,746 | 3/1972 | Land | 73/37 |
| 3,718,080 | 2/1973 | Yamamoto et al. | 355/100 X |
| 3,740,220 | 6/1973 | Haes et al. | 96/47 X |

OTHER PUBLICATIONS

"Contact Copy Platen With Transparent Membrane," J. O. Hildebrand, *IBM Technical Disclosure Bulletin*, pg. 1786, Vol. 8, No. 12, May, 1966.

*Primary Examiner*—Richard L. Moses
*Attorney, Agent, or Firm*—Robert L. Goldberg

[57] ABSTRACT

The invention described is a copier that is preferably small, light in weight, easy to use, self powered and portable. It may be used for reproducing a one or two-sided original that is flat or has a curved surface. The copier uses a single sheet diffusion transfer copy medium comprising a positive image receiving layer separated from a negative silver halide emulsion layer by a pigment layer. In use, an original to be copied is put in contact with the negative silver halide emulsion layer of the copy medium. Exposure is preferably by a battery powered, capacitance discharge flash lamp. Light passes in turn through the positive image receiving layer of the copy medium, the pigment layer, the negative emulsion layer and onto the original with reflection from the white background areas of the original back into the negative emulsion layer to form a latent image that is rendered visible in the positive image receiving layer by a diffusion transfer mechanism. The method is characterized by single sheet copying without a lens system and with dry-to-touch development. Developed images are positive, right-reading copies of the original and are of good resolution and contrast.

26 Claims, 5 Drawing Figures

APPARATUS FOR SINGLE SHEET PHOTOGRAPHIC REPRODUCTION

CROSS-REFERENCE TO RELATED APPLICATIONS

This is a continuation-in-part of copending U.S. patent application Ser. No. 330,981 filed Feb. 9, 1973.

BACKGROUND OF THE INVENTION

1. Introduction

The invention is directed to a rapid and inexpensive copier, especially a portable copier, for the photographic copying of an original and more particularly is directed to a photographic copier using a diffusion transfer copy medium where a right-reading, positive copy can be formed from an original with a single sheet copy medium.

2. Description of the Prior Art

To provide a copier that can be used anywhere such as at home, in offices, libraries, automobiles and the like, it is desirable that it possess a combination of desirable features. It should be light in weight, of small dimension, and have the option of having a self-contained source of power. Moreover, the copier should provide a rapid, high resolution, high contrast, right-reading and positive copy of an original and be capable of copying all originals, whether printed on one or both surfaces, transparent or opaque and flat or having a curved surface such as an open book. Further, it is desirable that the copier be inexpensive to make and use and in this respect, it is desirable that the copier not employ conventional optical systems — i.e., lens systems or an intermediate transfer layer — i.e., that the copier be a single sheet copier. Additional desirable features include ease of operation under all reasonable climatic conditions and dry-to-touch development.

Attempts have been made in the prior art to provide copier equipment using contact copying procedures with silver halide emulsions, but it is believed that no copier equipment of this type possesses the above described combination of desirable features.

As is known in the art, copies of original documents can be made by contact copying, either by the direct method or the reflex method, though both methods require the formation of a negative before a positive copy can be formed or the use of a reversal copy medium which requires complex development procedures.

Contact copying by the direct method involves holding the supporting base of an original to be copied against the emulsion side of a copy medium while light is passed through the original to form a latent image in the light sensitive coating. Originals copied by the direct method must be sufficiently translucent to permit the passage of light through to the light sensitive coating and must be printed on one side only. These two limitations alone are sufficient to prevent the development of a commercially feasible copier based upon this method of contact copying.

When copying an original by the contact-reflex method, the original is placed face up—i.e., with the information to be copied facing upward, and covered with the copy medium with the light sensitive coating face down in fact-to-fact contact with the original. Light is passed through the paper support and light sensitive coating to the surface of the original where it is absorbed by the black characters and reflected back to the coating by the white background areas. Although light passes through the entire sensitized surface to reach the surface of the original, only the additional exposure that the sensitized coating receives by the light reflected back from the white areas of the original affects the coating to the point where a visible image can be subsequently produced by development. Typically the copy is both negative and reverse-reading, though it can be used as an intermediate transfer layer or master for printing right-reading positives by the direct-contact method. Thus, the reflex negative is placed face down over a copy medium with the sensitized coating face up. Exposure then takes place through the reflex negative. Consequently, while it is possible to make a copier based upon contact reflex copying which provides copies of good quality, the copier requires an intermediate transfer layer (the reflex negative) and two exposures to the light source to provide a positive, right-reading copy of the original. This increases both the cost of the copying operation and of the copier.

In U.S. Pat. No. 2,908,571, there is disclosed a contact reflex copying method where a positive, right-reading copy can be obtained from an original without the use of an intermediate transfer layer as required in the procedure described above. The process of said patent is characterized by the use of a reversal type copy medium comprising a support of a base made to have a relatively high transparency by the addition of transparentizing agent so that photographic imaging can take place through the support. Following imaging, the transparentizing agent is removed by the processing chemicals to increase the opacity of the support. Thus, the transparentizing agent must first be added and then removed to obtain the objects of the invention.

In use of the aforesaid copy medium, the transparentized support of the copy medium is placed in contact with the printed side of the original to be copied. The composite is then exposed to light through the light sensitive layer of the copy medium. The light strikes the original and is reflected back into the light sensitive emulsion to form a latent image which is processed using reversal development procedures. These include the steps of development, fixing, re-exposure, development and fixing.

Following the aforesaid procedure, originals having an opaque support or printed on both faces can be copied. It is stated that the high transparency of the support during the exposure ensures a satisfactory resolving power and the appearance of the copy is said to be improved by the increase in opacity occuring during the photographic processing, The patent is not directed to a copier machine, but rather to darkroom photographic processing.

Though the aforesaid patent provides a means for forming a positive, right-reading copy of an original by reflex contact copying without resort to intermediate transfer layers, it is not without difficulty and the procedures of said patent are not applicable for use in a copier having the features noted above. For examples, the complex development procedures for reversal paper requiring two exposure steps, two development steps and two fixing steps cannot be incorporated into a small light-weight, easy to use copier. Moreover, with regard to the use of a transparentizing agent to make the support transparent and then opaque with processing, this agent must meet a number of strict requirements. Broadly, it must have a low vapor tension, be liquid or paste at ordinary temperatures, highly soluble in water of the processing baths, have little affinity for the paper, have a refractive index near that of cellulose and not interfere with the silver halide or processing chemicals. It is also necessary that the transparentizing agent have a pH near neutral and not form insoluble compounds with the components of the processing bath. Moreover, it should not have either oxidizing or reducing properties. Further, since it is virtually impossible to eliminate all of the transparentizing agent from the support during photographic treatment, it is necessary that it not affect the stability of the image which requires that it be free from oxidizing or sulfurizing products.

To meet the above requirements, the cost of the resultant copy medium would be excessively high and contamination of both the emulsion and the processing chemicals would result. In this respect, though the effect of the contamination on the processing chemicals may be minimal with the first few copies, as the number of copies increases, the build-up of contaminants will increase to a point where the processing chemicals will have to be discarded before they are exhausted.

In copending U.S. patent application Ser. No. 330,981, there is a provided a copier and method capable of providing single sheet positive, right-reading copy of an original which copier and method possesses the aforesaid combination of desirable features noted above. Thus, in addition to providing a positive high resolution right-reading copy of an original, the copier of said application may be made portable as it may be small, light in weight, self-powered and easy to use. Moreover, it is capable of copying all originals whether printed on one or both surfaces, transparent or opaque, or flat or of curved surface such as an open book. The copier of said application is inexpensive to make and use as it both avoids a lens system and is a single sheet copier as it does not use an intermediate transfer layer. Finally, copies are easily developed, preferably with the copier using dry-to-touch methods.

The method used to make copies in accordance with said application is a modified contact copying procedure where an original is placed such that the information to be copied is face up and covered with a copy medium having its light sensitive coating face up. In this way, the information side of the original is in contact with the support of the copy medium, not the light sensitive coating. The copy medium is an autopositive silver halide paper. The copy medium may contain developers or developer-fixer combinations. Exposure is preferably carried out with a battery powered capacitance discharge flash lamp. Exposure is preferably to yellow light such as by placing a yellow filter between the source of light and copy medium. Thus, exposure is through the filter, the light sensitive coating, the support and onto the original with reflection from the white background areas of the original back into the coating to form a latent image. The image can be developed using simple procedures such as by activation of developer components contained in the copy medium as described above. Developed images are dry-to-touch, right-reading, positive copies of the orignal and are of good resolution and contrast.

The copier is one designed to carry out the aforesaid process. It is characterized by features which include means to copy all documents, means to provide a battery powered, capacitance discharge flash exposure, means to direct the light source uniformly over the surface of the copy medium, means to process the copy medium and other features that are described in said application.

SUMMARY OF THE INVENTION

The subject invention is for a photographic copier similar to that of copending U.S. patent application Ser. No. 330,981 referenced above, but modified so that it uses a diffusion transfer copy medium rather than an autopositive copy medium.

The diffusion transfer copy medium used with the copier of the subject invention comprises a positive image receiving layer separated from a negative silver halide emulsion layer by a pigment layer. In use, an original to be copied is put in face-to-face contact with the negative silver halide emulsion layer of the copy medium, the information containing side of the original being in contact with the emulsion. Exposure takes place with light passing through the positive image receiving layer, the pigment layer, the negative emulsion layer and onto the original with reflection from the white background areas of the original into the negative emulsion layer to form a latent image that is rendered visible in the positive image receiving layer by diffusion transfer development techniques. When the positive image receiving layer is received, there is a positive right reading image of the original. The image in the negative emulsion layer is weak and blocked by the pigment layer.

The copier of the invention comprises a chamber which has means for advancing the aforesaid copy medium through the copier, a light source capable of providing sufficient light to form a latent image in the negative emulsion as it passes through the chamber, a light source combined with a reflector to distribute light uniformly over the copy medium and through the positive image receiving layer, the pigment layer, the negative emulsion layer and onto the original in that order, and means to develop said copy medium within the copier.

DESCRIPTION OF THE PREFERRED EMBODIMENTS

Figure 1:
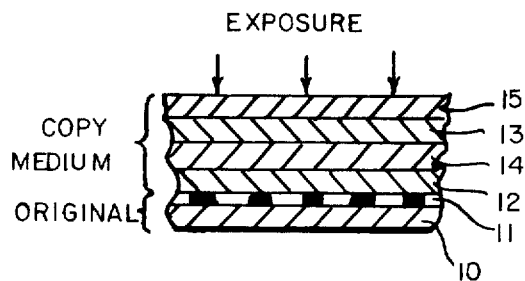
FIG. 1 shows a cross-section of a copy medium and original with exposure in accordance with one embodiment of the invention.

A composite of an original in contact with a copy medium is illustrated in FIG. 1 of the drawings. As shown in FIG. 1, the face of an original 10 having print thereon 11 is placed in contact with the negative photographic silver halide emulsion layer 12 of a copy medium having a positive image receiving layer 13 separated from the negative layer 12 by a pigment layer 14. A transparent support layer 15 may be placed over the positive image receiving layer 13, if desired. The composite is exposed to light, the transparent support layer if used, or the positive image receiving layer facing the light source. The incident light which successively passes through the transparent support 15, the positive image receiving layer 13, the pigment layer 14 and the negative emulsion layer 12 reaches the original 10 to be copied and is reflected back in inverse proportion to the densities printed on the face of the original—i.e., the light is absorbed by the black areas 11 and reflected by the white background areas back into the negative emulsion layer 12 to form a latent image therein.

Figure 2:
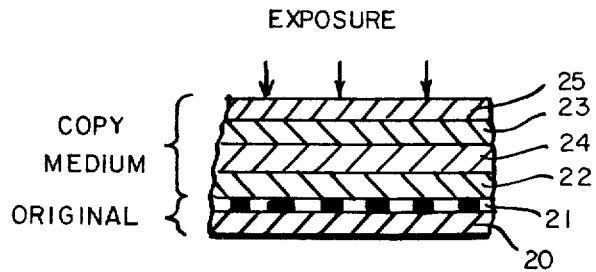
FIG. 2 is a copy medium with original in accordance with an alternative embodiment of the invention.

A composite of an original in contact with an alternative form of the copy medium is illustrated in FIG. 2 of the drawings. In this embodiment, the support layer is placed below the positive image receiving layer. There is provided the original 20 having print thereon 21, again in contact with a negative photographic silver halide emulsion layer 22 of the copy medium. In this embodiment, the negative emulsion layer 22 is separated from the positive image receiving layer 25 by the pigment layer 24 and the support layer 23. A latent image is formed in the negative emulsion layer 22 by passing light through the composite with reflection of the image back into the negative emulsion layer 22.

It should be noted that the composites shown in FIGS. 1 and 2 differ from the usual arrangement in reflex copying processes where an emulsion coated surface is in contact with the surface of an original bearing the information to be copied. The arrangement used in the process of this invention where the negative emulsion layer of the copy medium is in contact with an original coupled with diffusion transfer of the image to a positive image receiving layer makes it possible to obtain directly a right-reading, positive copy of the original.

For the purpose of the present invention, the support layer, when over the positive image receiving layer, has to be sufficiently transparent to permit a diffusion transferred image produced in the image-receving layer to be viewed through the support. A paper sheet that has been made transparent can be used. An especially suitable paper support is the so-called pergamin paper that owes its transparency to hydration and mechanical treatment at the preparation stage. Preferably, however, the transparent support sheet of the composite sheet material according to the present invention is a hydrophobic synthetic film support of thin cross-section—e.g., about 0.05 to 0.2 mm thick. Suitable hydrophobic synthetic polymers are cellulose esters, e.g. cellulose triacetate, polyesters e.g. polyethylene terephthalate, polystyrene, and copoly(vinyl chloride/vinyl acetate).

Any type of silver halide is suitable for the negative emulsion layer, provided the silver halide grains are capable of being developed and complexed in the exposed and non-exposed areas respectively with the rapidity required in diffusion transfer processes. The silver halide emulsion used may be a low-sensitive or a high-sensitive emulsion and may have either a steep gradation for the production of a line copy or a rather soft gradation for the production of a continuous tone image. For the reproduction of a line original often a low-sensitive silver chloride emulsion having a steep gradation is used, whereas for the reproduction of a continuous tone original preferably a silver bromoiodide emulsion having a soft gradation is used. Preferably, the developed reflex density of the silver halide emulsion does not exceed 0.8 so that after diffusion transfer development, the pigment layer is capable of blocking any residual image in the negative emulsion layer. The low reflex density can be accomplished by a low concentration of silver halide in the layer incorporation of blocking dyes and pigments and the like.

The pigment layer preferably contains white pigment particles. Barium sulphate and titanium dioxide are especially suitable for this purpose. The size of the pigment particles is of no great importance for the purpose of the present invention. Coarse as well as extremely fine grains are suited. The particle size mostly is comprised between 0.05 and 0.5$\mu$. In general, optimal results ore obtained with an amount of 10 to 20 g. of pigment and of 1 to 3 g. of hydrophilic colloid per sq. m. Gelatin is often used as a hydrophilic colloid binder of the pigment particles. However, other hydrophilic colloids and mixtures of two or more types of hydrophilic colloids may be used. A mixture of gelatin, and a hydrophilic colloid, in alkaline medium is especially suited as a binder of the pigment particles. Suitable hydrophilic colloids are addition products of high molecular weight hydroxyl group-containing compounds with acrolein, described in the U.S. Pat. No. 3,382,077 and especially water-soluble hydroxyalkyl esters of alginic acid, particularly propylene glycol esters of alginic acid, described in the U.S. Pat. No. 3,378,373.

As noted above, the pigment layer must pass sufficient light to contact the original for reflection back into the negative emulsion layer to form a latent image, and must be sufficiently opaque to block the image in the negative emulsion after it has been transferred to the positive image receiving layer. Also, the concentration of pigment must be sufficiently low to promote diffusion of complexed silver during development To accomplish this, the proportions of pigment and binder must be selected to give the described results.

The image-receiving layer present between the pigment layer and the transparent support sheet may comprise development muclei applied such as by vacuum coating but preferably is a hydrophilic colloid layer containing development nuclei. The hydrophilic colloid binder is preferably gelatin, although the gelatin may be replaced at least in part by other hydrophilic colloids. The development nuclei may be small metal particles but preferably are sulphides of heavy metals such as the sulphides of anitmony, bismuth, cadmium, cobalt, lead, nickel, silver and zinc. Of course, other types of development nuclei can be used. Further details on the composition and the thickness of the image-receiving layer as well as on the concentration of the development nuclei are superfluous. In this respect, reference is made to the very extensive literature, including the patent literature. The image-receiving layer may be applied, directly or indirectly by means of a suitable subbing layer, to the flexible transparent support layer.

The photographic copy medium may include additional layers, e.g. an antihalation layer, a top layer for protecting the silver halide emulsion layer against abrasion, or for completely screening the negative image from the eye, one or more intermediate layers to improve the adherence between layers, or to facilitate the diffusion of some substances from one layer to the other, an antistatic layer, which is preferably applied to the free rear side of a hydrophobic film support and the like.

The incorporation of development substances, especially of hydroquinone and a 3-pyrazolidinone developing agnet, into at least one layer of the composite sheet is a preferred embodiment of the present invention. Most preferably, all of the developing substances is incorporated into the photographic material, so that the processing liquid is reduced to a mere alkaline solution that is substantially free of developing agents, and consequently has better keeping properties.

A preferred photographic copy medium for use with the apparatus of this invention is disclosed in U.S. Pat. No. 3,740,220 incorporated herein by reference. Other diffusion transfer copy sheets are in the prior art.

As described above, the copy medium is exposed by passing light of suitable activating energy sequentially through the positive image layer (and support therefore), the pigment layer and the negative emulsion layer onto an original in face-to-face contact with the negative emulsion layer. The light is reflected back from the original into the negative emulsion layer in the image pattern to form a latent image.

For producing a diffusion transfer image, the copy medium is wetted with an aqueous processing liquid in the presence of developing agnet, a complexing agent for silver halide, e.g. sodium thiosulphate, and an alkali. The alkali and the complexing agent for silver halide are either in the liquid or the copy sheet. The development compound(s) for silver halide, are preferably present in the photographic material as described above. The processing liquid preferably has a rather low viscosity and is an awueous solution. It may contain additional ingredients, e.g. heavy metal ions-sequestering agents, and anti-silver sludge agents, stabilizers, image-tone improvers, wetting agents and the like.

After a short processing time, an excellent diffusion transfer image becomes visible through the support.

Exposure of the photographic composite is preferably to a capacitance discharge flash lamp such as a flashbulb or an electronic flash unit capable of multiple flashes. Such equipment is well known in the art and described by Edgerton, *Electronic Flash, Strobe*, McGraw Hill Book Company, New York 1970. The duration of the flash and its intensity are not critical and need no further discussion. It should be understood that other light sources such as light sources that emit over a greater duration of time at substantially decreased intensity may be used. However, for reasons not fully understood, copies obtained using capacitance discharge flashlamps are superior to those copies obtained using other light sources.

After exposing the copy medium, it is preferably developed by in situ development which is defined herein as development with chemicals contained in whole or in part in the copy medium as described above. Thus, the chemicals may be mixed with the materials of the copy medium or placed in a pod displaced across the width of the copy medium at various intervals such that when the copy medium is passed through the copier, a roller or other device ruptures the pod and spreads the chemicals. Alternatively, the developer may be encapsulated and mixed with the materials of the copy medium. The capsules would be ruptured during processing such as by a roller. As a further alternative, the development chemicals may be blended with the materials of the copy medium. Development and diffusion transfer would occur by contacting the exposed copy medium, such as by wicking, with an activator solution for the developer such as an aqueous solution of an alkali.

Figure 3:
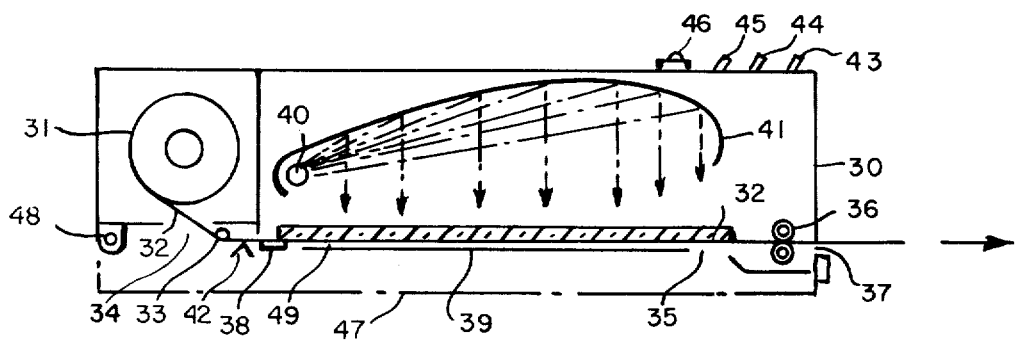
FIG. 3 is a schematic representation of a copier apparatus in accordance with the invention.

In FIG. 3 of the drawings, there is represented a copier apparatus in simplified schematic form. The copier apparatus illustrated is small in size, light in weight and portable. It should be understood, however, that the invention described is not limited to the small copier apparatus illustrated in FIG. 3 but is also applicable to larger, more complex apparatus.

The copier comprises chamber 30 which is preferably rectangular in shape. It may conveniently have dimensions of about 15 inches in length by 10 inches in width with an overall height of about 2 to 3 inches. Within chamber 30, there may be placed a cartridge 31 having a continuous web of copy medium 32. The copy medium 32 may be perforated along its length on either or both edges to facilitate feeding. Further, it may have perforations across its width at fixed lengths along the web to facilitate tearing from the remainder of the web after exposure and development. Finally, the copy medium may have pods at intervals across its width containing developer and fixer, activator for developer, and fixer in the emulsion, or the like.

The web of the copy medium 32 is fed from cartridge 31 over guide means 33 which may comprise a spindle for the perforations along the edge of the paper or a rubber roller. The web passes external to chamber 30 through slot 34 and back into chamber 30 through slot 35. Drive mechanism 36 is provided to both cause the passage of the paper through the apparatus and to guide the paper out of the apparatus through exit slot 37 after exposure and development. Drive mechanism 36 can be simply two rollers driven by a small motor (not shown) powered by a power source such as a battery or external source of electricity. Alternatively, for manual operation, a gripper 38 in a suitable slot along the edge of the apparatus may be provided to pull the web through the apparatus after the sheet is separated from the remainder of the web by cutting or tearing along the perforations.

During that portion of the process when the web 32 is external to the apparatus between slots 34 and 35, the positive image receiving layer is facing towards the inside of the apparatus and the paper support faces outward. An original 39 to be copied is then placed in contact with the negative emulsion layer of the web of copy medium 32 external to the apparatus. With this composite of the original to be copied and the copy medium in the configuration described, there is reproduced the composite illustrated in FIGS. 1 and 2 of the drawings.

Figure 4:
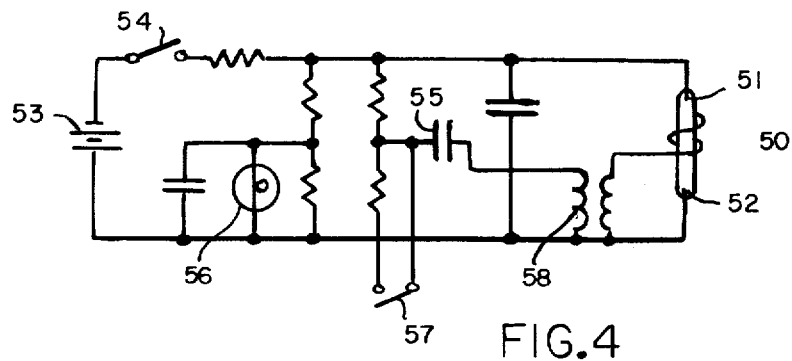
FIG. 4 is a simple circuit for providing battery operated, capacitance discharge flash exposure.

The light source for the apparatus of FIG. 2 as represented comprises a flashlamp 40 capable of multiple illuminations and placed at one outer edge of a suitable shaped reflector 41. The flashlamp is designed for operation utilizing suitable circuitry such as illustrated in FIG. 4 of the drawings. The reflector is so arranged that there is even distribution of the light over the entire surface of the copy medium in contact with the original. The light passes through the support layer of the coppy mediu, through the positive image receiving layer, the pigment layer, the negative emulsion layer and onto the original 39 where it is reflected back into the negative emulsion layer to form a latent image.

Following exposure in the manner described, the copy medium 32 is advanced by drive mechanism 36 back into chamber 30 through slot 35. As the copy medium enters slot 35, it may pass under wicking means (not shown) which applies a uniform, thin layer of a developer from a reservoir (not shown), or an activating agent for developer if the developer is contained in the copy medium. However, in the embodiment of the invention described in FIG. 3, the developer or activator is contained in sealed pods (not shown) placed at intervals along the width of web 32.

The developer or activator preferably contains a thickening agent and a drying agent. The pods across the width of the copy medium 32 are ruptured and developer or activator is spread evenly over the copy medium as it passes through drive mechanism 36 which may be a pair of rolls, the top being teflon coated and the lower roll being rubber. The web with the developed image then passes out of chamber 30 and can be torn from the continuous web if preforated or prior to removal from chamber 30, cut with knife 42 which would slide along a slot in the bottom of the apparatus.

To protect the web 32 external to the apparatus between slots 34 and 35, there is provided a cover 47 which pivots on hinge 48. This cover may be used to force the original into a more firm contact with the copy medium and can contain guides to properly locate the original for proper placement on the copy medium.

In a manner that would be obvious to those skilled in the art, the apparatus of FIG. 3 is provided with an on-off switch 43, a paper advance switch 44 if mechanically driven, a lamp discharge switch 45 and a neon indicator 46 for indicating a full charge on the capacitor of the capacitor discharge lamp.

A soft, resilient, transparent material 49 may be placed between the indicent light and the copy web 32 such as an air pillow of a suitable plastic, e.g. polyethylene. By providing this material, the copying of originals not having a flat surface such as the page of a book is facilitated. The original can be pressed into the resilient material so that there is intimate contact between the copy medium and the original to be copied thereby assuring good image resolution.

In FIG. 4 of the drawings, there is illustrated a simple circuit for activating a flashlamp such as that of FIG. 3. The flashlamp 50 having anode 51 and cathode 52 is preferably a xenon flashlamp. The circuit is activated by a battery 53 in combination with switch 54. This switch is equivalent to the on-off switch 43 of FIG. 3. The battery preferably comprises a zinc-air battery and as such, may comprise the walls of the cassette for the copy medium and the air contained therein. In this way, whenever the cassette is replaced, a new, inexpensive battery is also provided. Alternatively, a separate battery may be provided. Activating the circuit with switch 54 activates trip capacitor 55. When the trip capacitor is fully charged, the neon indicator lamp 56 (46 of FIG. 3) glows. The capacitor 55 may then be discharged with switch 57 (45 of FIG. 3) which activates transformer 58 causing discharge of flashlamp 50.

Figure 5:
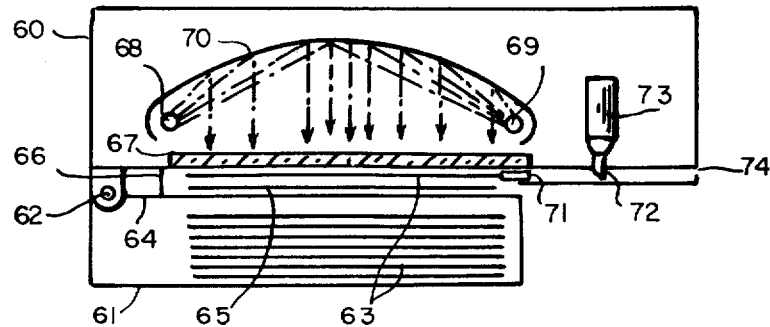
FIG. 5 is a schematic representation of another embodiment of copier in accordance with the invention.

In FIG. 5 of the drawings, there is illustrated an alternative embodiment of a copying apparatus in accordance with the invention. Again, the apparatus is small, light in weight, and portable. The apparatus comprises chamber 60 having dimensions of about 15 inches in length by 10 inches in width with an overall height of 2 to 3 inches. Below chamber 60, there is a disposable, easily removable cartridge 61 attached to chamber 60 by hinge 62. Cartridge 61 contains single sheets of copy medium 63 as contrasted to the continuous web 32 of FIG. 3 and has a rigid support over its top 64. One or more walls of the cartridge may be a power source such as a zinc-air battery.

In use, a sheet of copy medium 63 is removed from cartridge 61 which has been separated from chamber 60 by pivoting the same upward. A composite is formed by placing an original to be copied 65, face upward on rigid support 64. A slot 66 is provided along the side of cartridge 61 to facilitate copying of a book. The copy sheet 63 is then placed on top of the original with the side to be copied face upwards so that a composite such as that of FIG. 1 or 2 is provided. Chamber 60 is then pivoted downward so that it rests on top of the composite of the copy medium 63 and the original 65. Directly in contact with the light sensitive layer of copy medium 63 is air pillow 67. Imaging then takes place in a manner analogous to the method set forth with regard to FIG. 3 except that in this embodiment, two synchronized flashlamps 68 and 69 are used in conjunction with a suitable reflector 70 to assure uniform exposure over the entire surface of the copy medium. Upon exposure, light passes through the light copy medium 63 and onto the printed surface of the original 65. The light is reflected back into the negative emulsion layer of the copy medium to form the latent image.

The developers used to form the visible image by diffusion transfer in accordance with this embodiment of the invention are dry and mixed with one or more layers of the copy medium 63. To develop the image, the copy medium is moved through the apparatus using gripper mechanism 71 which advances the copy medium beneath a wick 72 which wets the surface of the copy medium with an activator solution, for example to bring pH to a requisite value. The supply of activator is from reservoir 73. A visible image is formed rapidly in the copy medium as it passes beneath wick 72. The developed and fixed copy is removed from chamber 60 through slot 74. The copier is supplied with the same controls (not shown) as the controls provided for the copier of FIG. 3 except the paper advance switch is omitted since the copier in this embodiment is manual.

EXAMPLE

Both sides of a cellulose triacetate film support having a thickness of 0.1 mm. may be coated with a gelatin subbing layer.

One side of the resulting subbed film support may then be provided with a mat layer from the following coating composition in a ratio of 10 sq. m./litre:

| | |
|---|---|
| Water — | ml — 500 |
| Silica — | g — 140 |
| Gelatin — | g — 70 |
| Water up to 1000 ml. | |

The other side of the subbed film support may be coated successively with the following layers:

An image-receiving layer obtained by applying the following coating composition at a ratio of 30 sq. m./litre:

| | |
|---|---|
| Water — | ml — 820 |
| Gelatin — | g — 60 |
| Dispersion of silver sulphide in an aqueous solution of gelatin(0.2% of silver sulphide and 11.6% of gelatin | ml — 30 |
| A 1% solution of 1-phenyl-5-mercaptotetrazole in ethanol — | ml — 1 |

| | | |
|---|---|---|
| 1-phenyl-3-pyrazolidinone | g — | 5 |
| 12.5% aqueous solution of saponin — | ml — | 30 |
| Water to 1000 ml. | | |

A pigment layer obtained by apply the following coating composition at a ratio of 10 sq. m./litre:

| | | |
|---|---|---|
| Water — | ml — | 603 |
| Titanium dioxide — | g — | 120 |
| Gelatin — | g — | 4.8 |
| Propylene glycol ester of alginic acid — | g — | 17.2 |
| 12.5% aqueous solution of saponin — | ml — | 25.8 |
| 20% aqueous solution formaldehyde — | ml — | 4.3 |
| Water to 1000 ml. | | |

A gelatin coarse-grain silver chloride emulsion layer containing hydroquinone and 1-phenyl-3-pyrazolidinone. Per sq. m. 150 mg. of hydroquinone 75 mg. of 1-phenyl-3-pyrazolidinone and an amount of silver chloride equivalent with 0.5 g. of silver nitrate were present.

The photographic composite material thus obtained can be in continuous sheet form in a cannister that can be loaded in the apparatus of FIG. 3 of the drawings in such a manner that the negative emulsion side would be in contact with an original and exposed reflectrographically through the support.

Exposure would be by a xenon flashlamp and the copy sheet would pass through the apparatus as described in detail in the discussion accompanying FIG. 3. The activating or processing liquid used would have a composition as follows: copy medium,

| | |
|---|---|
| Sodium phosphate | 75 gm. |
| Anhydrous sodium sulphite | 40 gm. |
| Anhydrous sodium thio-sulphate | 10 gm. |
| Water to 1 liter | |

A high quality diffusion transfer image becomes visible through the cellulose triacetate support.

I claim:

1. An apparatus for making a right reading, positive, single sheet copy of an original, said apparatus comprising, in combination a diffusion transfer copy medium and having a positive image receiving layer separated from a negative photographic layer by a visually opaque layer, a chamber having one wall which defines an exposure zone and a light source in said chamber for providing sufficient light to form a latent image in said copy medium; means to uniformly distribute light over said copy medium; means for advancing said copy medium in sheet form a storage position inside from said chamber, along a path outside of said chamber into optical communication with said exposure zone, and back into said chamber for development; means to develop said copy medium; said copy medium, when in optical communication with said exposure zone, being disposed such that an original to be copied can be placed in-face to face contact with the negative photographic layer of said copy medium, whereby, upon exposure, light passes successively through the positive image receiving layer of the copy medium, the visually opaque layer, the negative photographic layer and onto the original where it is imagewise reflected back into the copy medium to form a latent image.

2. The apparatus of claim 1 where the negative photographic layer of said copy medium is a silver halide emulsion.

3. The apparatus of claim 1 having a soft, transparent and resilient material between the light source and the copy medium.

4. The apparatus of claim 1 where the light source is a flash lamp capable of multiple illumination.

5. The apparatus of claim 1 where the means to distribute light uniformly over said copy medium is a reflector.

6. The apparatus of claim 1 where copy medium is in roll form in a cartridge and means to pass said copy medium from said roll through said chamber as a continuous web.

7. The apparatus of claim 6 where said continuous web of copy medium is perforated across its width at intervals along its length.

8. The apparatus of claim 6 where said cartridge comprises at least in part a battery.

9. The apparatus of claim 1 where said means to develop said copy medium comprises a wetted wick which passes over said copy medium as it passes through said chamber after exposure.

10. The apparatus of claim 9 where the wick is in combination with a reservoir for developer or activator.

11. The apparatus of claim 1 where the copy medium is in combination with a developer.

12. The apparatus of claim 1 where the copy medium has a rupturable pod containing developer at intervals across its width.

13. The apparatus of claim 11 where the developer is a monobath developer comprising a developing and fixing agent in rupturable pods spaced at intervals across the width of the copy medium.

14. The apparatus of claim 2 where the emulsion has microcapsules containing developer and fixer for said emulsion distributed over the surface of said copy medium.

15. An apparatus for making a right reading, positive, single sheet copy of an original, said apparatus comprising, in combination, a diffusion transfer copy medium having a positive image receiving layer separated from a negative photographic layer by a visually opaque layer; a chamber having one wall which defines an exposure zone and a light source capable of providing sufficient light to form a latent image in said copy medium; means to uniformly distribute light over said copy medium; means for advancing said copy medium in sheet form from a location outside of said chamber, in optical communication with said exposure zone, into said chamber for development; means to develop said copy medium; said copy medium, when external to said chamber, being disposed such that an original to be copied can be placed in face to face contact with the negative photographic layer of said copy medium, whereby, upon exposure, light passes successively through the positive image receiving layer of the copy medium, the visually opaque layer, the negative photographic layer and onto the original where it is imagewise reflected back into the copy medium to form a latent image.

16. The apparatus of claim 15 where the negative photographic layer of said copy medium is a silver halide emulsion.

17. The apparatus of claim 15 having a soft, transparent and resilient material between the light source and the copy medium.

18. The apparatus of claim 15 where the light source is a flash lamp capable of multiple illumination.

19. The apparatus of claim 15 where the means to distribute light uniformly over said copy medium is a reflector.

20. The apparatus of claim 15 including a cartridge for storing single sheets of said copy medium.

21. The apparatus of claim 20 where said cartridge comprises at least in part a battery.

22. The apparatus of claim 15 where said means to develop said copy medium comprises a wetted wick which passes over said copy medium as it passes through said chamber after exposure.

23. The apparatus of claim 22 where the wick is in combination with a reservoir for developer or activator.

24. The apparatus of claim 15 where the copy medium is in combination with a developer.

25. The apparatus of claim 23 where the developer is a monobath developer.

26. The apparatus of claim 16 where the emulsion has microcapsules containing developer and fixer for said emulsion distributed over the surface of said copy medium.

* * * * *